United States Patent
Betz et al.

(10) Patent No.: US 11,332,012 B2
(45) Date of Patent: May 17, 2022

(54) DEVICE AND METHOD FOR CONTROLLING AN INTERIOR LIGHTING SYSTEM OF A VEHICLE

(71) Applicant: DAIMLER AG, Stuttgart (DE)

(72) Inventors: Daniel Betz, Rottenburg-Seebronn (DE); Daniel Fuhrmann, Böblingen (DE); Michael Holz, Senden (DE); Juergen Ketterer, Böblingen (DE); Daniel Steffen Setz, Böblingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 20 days.

(21) Appl. No.: 16/096,912

(22) PCT Filed: Apr. 10, 2017

(86) PCT No.: PCT/EP2017/000453
§ 371 (c)(1),
(2) Date: Oct. 26, 2018

(87) PCT Pub. No.: WO2017/186338
PCT Pub. Date: Nov. 2, 2017

(65) Prior Publication Data
US 2019/0118653 A1    Apr. 25, 2019

(30) Foreign Application Priority Data
Apr. 29, 2016   (DE) .................... 10 2016 005 255.4

(51) Int. Cl.
*B60K 37/06*   (2006.01)
*B60K 35/00*   (2006.01)
(Continued)

(52) U.S. Cl.
CPC .............. *B60K 37/06* (2013.01); *B60K 35/00* (2013.01); *B60Q 3/74* (2017.02); *B60Q 3/76* (2017.02);
(Continued)

(58) Field of Classification Search
CPC .... B60K 37/06; B60K 35/00; B60K 2370/11; B60K 2370/31; B60K 2370/171;
(Continued)

(56) References Cited

U.S. PATENT DOCUMENTS 9,522,631 B2   12/2016 Kleinert et al.
9,931,984 B2   4/2018 West
(Continued)

FOREIGN PATENT DOCUMENTS

CN   103381762 A   11/2013
CN   103707769 A   4/2014
(Continued)

OTHER PUBLICATIONS

International Search Report dated Aug. 1, 2017 in related International Application No. PCT/EP2017/000453.
(Continued)

*Primary Examiner* — Chanh D Nguyen
*Assistant Examiner* — Andrew Lee
(74) *Attorney, Agent, or Firm* — Patent Portfolio Builders PLLC

(57) ABSTRACT

A device for controlling an interior lighting system of a vehicle to produce ambient lighting and/or reading lighting involves the interior lighting system having an array of a plurality of light sources. The device includes a control unit, by means of which the light sources of the array can be individually controlled in order to produce the ambient lighting and/or the reading lighting, and an input unit that can be connected to the control unit. The input unit has a
(Continued)

Figure 1:
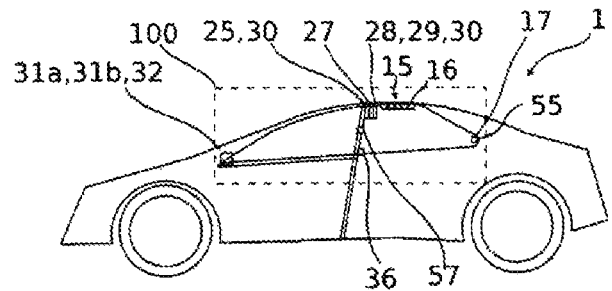

touch-sensitive screen for inputting a current set of control information for the control unit. The control unit controls the light sources on the basis of the current set of control information. Furthermore, the input unit, on the basis of the current set of control information, displays associated ambient lighting and/or reading lighting for an illuminable region in the vehicle interior on the screen.

20 Claims, 3 Drawing Sheets

(51) Int. Cl.
  *B60Q 3/74* (2017.01)
  *B60Q 3/85* (2017.01)
  *B60Q 3/76* (2017.01)
(52) U.S. Cl.
  CPC ............ *B60Q 3/85* (2017.02); *B60K 2370/11* (2019.05); *B60K 2370/111* (2019.05); *B60K 2370/1438* (2019.05); *B60K 2370/1442* (2019.05); *B60K 2370/151* (2019.05); *B60K 2370/152* (2019.05); *B60K 2370/171* (2019.05); *B60K 2370/188* (2019.05); *B60K 2370/31* (2019.05); *B60K 2370/332* (2019.05); *B60K 2370/338* (2019.05); *B60K 2370/345* (2019.05); *B60K 2370/349* (2019.05); *B60K 2370/48* (2019.05); *B60K 2370/573* (2019.05); *B60K 2370/736* (2019.05); *B60K 2370/739* (2019.05); *B60K 2370/771* (2019.05)
(58) Field of Classification Search
  CPC ........ B60K 2370/771; B60K 2370/332; B60K 2370/573; B60K 2370/1438; B60K 2370/48; B60K 2370/345; B60K 2370/111; B60K 2370/151; B60K 2370/152; B60K 2370/338; B60K 2370/1442; B60K 2370/739; B60K 2370/736; B60K 2370/349; B60K 2370/188; B60Q 3/74; B60Q 3/76; B60Q 3/85
  See application file for complete search history.

(56) References Cited

U.S. PATENT DOCUMENTS

| | | | | |
|---|---|---|---|---|
| 2005/0280524 | A1* | 12/2005 | Boone | B60K 35/00 340/461 |
| 2008/0297726 | A1* | 12/2008 | Rodriguez, Jr | G03B 21/14 353/13 |
| 2009/0018709 | A1 | 1/2009 | Hellwig et al. | |
| 2009/0312900 | A1* | 12/2009 | Tschirhart | B60K 37/06 701/36 |
| 2010/0188343 | A1* | 7/2010 | Bach | B60K 37/06 345/173 |
| 2010/0312366 | A1* | 12/2010 | Madonna | G05B 19/042 700/90 |
| 2013/0120238 | A1* | 5/2013 | Spaulding | H05B 37/0227 345/156 |
| 2014/0265934 | A1 | 9/2014 | Ramey | |
| 2015/0100203 | A1* | 4/2015 | Tai | B60Q 3/85 701/36 |
| 2015/0301664 | A1* | 10/2015 | Tsai | G06F 3/0412 345/173 |
| 2016/0062327 | A1* | 3/2016 | Fagan | B64D 11/00153 700/83 |
| 2016/0078593 | A1* | 3/2016 | Mesguich Havilio | G06T 3/40 345/668 |
| 2016/0280039 | A1 | 9/2016 | Vanhelle | |
| 2017/0166056 | A1* | 6/2017 | Buttolo | G06F 3/0482 |

FOREIGN PATENT DOCUMENTS

| | | |
|---|---|---|
| CN | 104302504 A | 1/2015 |
| CN | 104442400 A | 3/2015 |
| CN | 105323918 A | 2/2016 |
| DE | 102004061417 A1 | 7/2006 |
| DE | 102012010044 A1 | 11/2013 |
| DE | 102013009063 A1 | 12/2014 |
| DE | 102014215329 A1 | 2/2016 |
| DE | 102015118092 A1 | 5/2016 |
| DE | 202015001767 U1 | 6/2016 |
| DE | 102015011891 A1 | 1/2017 |
| EP | 2172366 A1 | 4/2010 |
| EP | 2709427 A2 | 3/2014 |
| EP | 2982541 A2 | 2/2016 |
| WO | 2015044539 A1 | 4/2015 |

OTHER PUBLICATIONS

Search Report created on Mar. 21, 2017 in related DE Application No. 10 2016 005 255.4.
Written Opinion dated Aug. 1, 2017 in related International Application No. PCT/EP2017/000453.
Examination Report created on Jan. 30, 2018 in DE Application No. 10 2017 005 126.7.
International Search Report dated Aug. 31, 2018 in International Application No. PCT/EP2018/063777.
Written Opinion dated Aug. 31, 2018 in International Application No. PCT/EP2018/063777.
Office Action dated Apr. 3, 2020 in co-pending U.S. Appl. No. 16/617,066.
Applicant Reply filed on Apr. 24, 2020, responsive to Office Action dated Apr. 3, 2020 in co-pending U.S. Appl. No. 16/617,066.
Office Action dated Dec. 28, 2020 in related/corresponding CN Application No. 201780025016.X.

* cited by examiner

| Interior lighting system | Reading light | Spot A | Spot B | Settings |
|---|---|---|---|---|
| Internal light <br> Standard function <br> ☒ Effect when switching on/off <br> ☒ Factory settings <br> Individual function <br> ☒ Effect when switching on/off <br> ☒ Save on exit <br> ☐ Factory settings | Reading light <br> Standard function <br> ☒ Effect when switching on/off <br> ☒ Effect during pivoting <br> ☒ Position analogous to seat setting <br> ☒ Factory settings <br> Individual function <br> ☒ Effect when switching on/off <br> ☒ Effect during pivoting <br> ☒ Save on exit <br> ☐ Factory settings | Spot A <br> Individual function <br> ☐ Effect when switching on/off <br> ☐ Effect during pivoting <br> ☐ Save on exit <br> ☒ Factory settings | Spot B <br> Individual function <br> ☐ Effect when switching on/off <br> ☐ Effect during pivoting <br> ☐ Save on exit <br> ☒ Factory settings | |

Fig.6

DEVICE AND METHOD FOR CONTROLLING AN INTERIOR LIGHTING SYSTEM OF A VEHICLE

BACKGROUND AND SUMMARY OF THE INVENTION

Exemplary embodiments of the invention relate to a device and a method for controlling an interior lighting system for a vehicle. In the present case, the term "interior lighting system" in the vehicle includes internal lighting and reading lighting. The reading lighting comprises a light cone that illuminates a specific working region, for example for writing or reading. In the case of the internal lighting, the entire interior or portions of the interior of the vehicle are illuminated preferably uniformly.

Exemplary embodiments of the invention are directed to a device and a method for controlling an interior lighting system for a vehicle that permit flexible and convenient operation.

A first aspect of the invention relates to a device for controlling an interior lighting system of a vehicle, the interior lighting system comprising an array of a plurality of light sources for producing internal lighting and/or reading lighting. The device comprises a control unit by means of which the light sources of the array can be individually controlled in order to produce the ambient lighting and/or the reading lighting. The device also comprises an input unit that can be connected to the control unit, the input unit having a touch-sensitive screen for inputting a current set of control information for the control unit. The control unit is designed to control the light sources on the basis of the current set of control information, and the input unit is designed, on the basis of the current set of control information, to display associated internal lighting and/or reading lighting for an illuminable region in the vehicle interior on the screen.

An advantageous effect of the invention is that passengers can adjust the lighting conditions ergonomically and in a variety of ways, in particular in the rear region of a vehicle.

Preferably, the light sources of the array comprise at least one or more LEDs. In this case, the abbreviation LED means "light emitting diode." In order to produce different color temperatures, a light source of the array comprises at least two or more LEDs in each case, which emit different light colors. Advantageously, a light source comprises three or four LEDs.

In the present case, the term "interior of the vehicle" is understood to mean in particular the interior of a vehicle that can be used by vehicle passengers. In the case of passenger cars, the rear region of the vehicle interior is particularly significant. The vehicle may be a passenger car, truck, bus, rail vehicle, watercraft (for example a ship), underwater vehicle, or an aircraft.

The rear region of a vehicle is, for example, the backmost region of a vehicle in the main direction of travel, in particular a passenger region for passengers, a row for passengers, for example drivers and front-seat passengers, being arranged in front of the rear region.

The interior lighting system is suitable for illuminating the interior of different kinds of vehicles. The array consists of a plurality of individual light sources, i.e., at least two individual light sources form the array. Preferably, a large number of individual light sources are used in this case. In the simplest case, the array is designed as a linear array, so that the individual light sources are arranged in a row. Preferably, the array is two-dimensional, i.e., planar, the individual light sources thereby being arranged in a 2D grid shape. Alternatively, projection technology, such as that used in a projector (e.g., DLP or LCD), may be used instead of an LED array.

In the present case, the term "internal lighting" is understood to mean illumination of the entire vehicle interior or parts of the vehicle interior (for example, the rear region of the vehicle interior) that is as uniform as possible, even diffused. The internal lighting therefore regulates the overall brightness in the vehicle interior or at least large contiguous regions of the vehicle interior.

In the present case, the term "reading lighting" is understood to mean illumination of a severely restricted partial volume of the vehicle interior (in particular, illumination of the reading or working region for a vehicle passenger) that is as uniform as possible. The brightness of the reading light is advantageously selected such that it is possible to work or read without fatigue.

The term "touch-sensitive screen" is advantageously understood to mean a touch screen. A "touch-sensitive screen" is a combined input and output device, i.e., the functions "user input" and "visualization" are combined in a single device. The visualization can also be referred to as the display. The display is implemented preferably by means of a graphical user interface (GUI). The function "user input" is preferably implemented by touching parts of the screen that directly control a program run of the device or of a device connected to the screen, for example a computer.

The input unit having the touch-sensitive screen is preferably permanently installed in the vehicle. The input unit may also be mobile, e.g., a smartphone, a tablet PC, a laptop with touchscreen or a comparable device.

In other words, an interior lighting system can be arranged in the rear region of the vehicle which comprises a row, a grid, or another planar arrangement of light sources. These light sources can be controlled by a control unit. The term "control" includes each conceivable time signal of the electrical input voltage and/or the applied amperage for setting the transmitted light of the light sources, in particular an on/off function, dimming the luminous flux or setting a light color. The relevant signals can be modeled either in the frequency domain or in the time domain. Furthermore, there is a touch-sensitive screen on which a user can activate an input for operating the array of light sources and which can simultaneously display a visualization of the set illumination.

The associated internal lighting and/or reading lighting is displayed, on the basis of the input current set of control information, preferably symbolically for an illuminable region in the vehicle interior, so that a segment on the screen shows an illuminable zone in the rear region of the vehicle. In this case, parameters, such as the brightness of the lighting (internal lighting/reading lighting) and the color of the lighting (internal lighting/reading lighting), are advantageously reproduced on the screen as realistically as possible. The display of the settings for the interior lighting system selected by a user are therefore displayed on the screen preferably in as self-explanatory a manner as possible. If the user changes the control information, the display on the screen is changed accordingly.

According to an advantageous embodiment, there is a first input element on the screen for confirming the current set of control data, the control unit being designed to implement associated internal lighting and/or reading lighting in the vehicle interior, by correspondingly controlling the light sources, only after confirmation on the basis of the current set of control information.

A user can therefore establish a large number of settings on the touch-sensitive screen, without the control unit actually implementing a setting on the light sources of the array. This is a preview function. In other words, the control unit is designed to show a preview of the internal lighting and/or reading lighting on the light sources of the array only when the currently established settings of the control information are confirmed by the user. In this case, the preview is shown on the touch-sensitive screen, preferably symbolically, with corresponding color and brightness.

According to a further advantageous embodiment, the control unit is designed, during the input of a current set of control information into the input unit, to implement internal lighting and/or reading lighting associated with the control information in the vehicle interior in real time by controlling the light sources correspondingly.

In contrast to the preview function described above, no preview is produced in this embodiment. Instead, all inputs are made by the control unit in real time, or virtually in real time, by correspondingly controlling the light sources on the array. This means that the input of a user on a slider for setting a luminous flux or brightness is sent, directly and without delay, with the exception of inertia-related delays and the delay times caused by the electronic control, to the control unit, which in turn directly controls the light sources in accordance with these settings. In order to easily change parameters of the control information, sliders or other input fields are preferably produced on the screen for inputting.

According to a further advantageous embodiment, a set of control information comprises one or more of the following elements/parameters:
  a color temperature,
  the value of luminous flux for the brightness of the internal lighting and/or the reading lighting,
  an illumination region of the reading lighting in the vehicle interior,
  a lighting scenario for the internal lighting,
  a lighting scenario for the reading lighting,
  a start time and/or an end time or a period of time for the activation of the internal lighting and/or the reading lighting by means of the control unit,
  a time course of the color temperature,
  a time course of the value of the luminous flux for the brightness,
  a time course of an arrangement, shape, and/or size of the illumination region of the reading lighting in the vehicle interior,
  a temporally variable lighting scenario for the internal lighting, and
  a temporally variable lighting scenario for the reading lighting.

In order to implement desired luminous flux or brightness, color temperatures, time courses and pre-set lighting patterns, respectively, the light sources of the array are provided with or designed so as to have corresponding features and degrees of freedom.

In this case, the expression "color temperature" represents a light color or a spectrum. Color temperatures of 3,000 kelvin, which has a warm white hue, over 4,000 kelvin, which has a light hue between warm white and neutral white with a tendency toward a daylight white, or up to 6,000 kelvin for cold white light are typical examples. Furthermore, either individual light sources can emit light in a plurality of colors or individual light sources can each have one color that is, however, different to that of other individual light sources. The first case can be comparable with an RGB pixel, the pixel producing the colors red, green and blue and being able to display a large number of colors in an additive color mixture. In this case, the control unit can set the color temperature of the light path by activating or mixing individual pixel colors in a targeted manner. A large number of color temperatures can therefore be set. Preferably the color temperature, in particular for the reading light, is set by means of warm white LEDs and cold white LEDs, the proportions of which are mixed in order to set the desired color temperature.

The term "luminous flux" describes a quantity of energy per unit of time, i.e., a quantity of light per time, that is emitted from a light source. As a result, the brightness can be regulated, for example, by adjusting the electric voltage applied to a light source, or by adjusting the current. In the case of alternating current, a light source can also be dimmed, for example, by cutting the phase. Preferably, a light source is dimmable, irrespective of the kind of power supply, positioning or other conditions.

The term "lighting scenario" refers to a pre-set quantity of control information. The term includes a predetermined interior lighting system that is constant over time or a predetermined interior lighting system that varies over time.

Advantageously, a plurality of light sources of the array have different beam characteristics, and the control unit is designed such that a beam characteristic of the array can be set by selecting and activating individual light sources of the array. The term "beam characteristic" (also called "directivity") refers to the angle dependence of the intensity of the emitted light beam in this case. By changing the beam characteristic of the array, the beam angle of the array or parts of the array can be adjusted, the beam angle typically defining the angle at which the emitted light intensity is 50% of the maximum light intensity.

Advantageously, at least two of the individual light sources of the array are different. Mutual differences may be the color temperature and/or the beam characteristic of each light source. In this case, the array comprises a large number of light sources, at least two of which have differing beam angles of the light. Due to the fact that there is a plurality of light sources having mutually deviating beam angles, a main direction of the light beam direction of the array, i.e., the beam angle of the array, can be set by activating specific light sources in a targeted manner. If, for example, four light sources face further upward than four others, an average main light emission direction of the array can be achieved by switching on four of the light sources directed further upward and switching on two of the light sources directed further downward, which main light emission direction tends to face in the direction of the light sources directed upward, without exploiting the upper maximum angle of the main light emission direction of the array. Depending on the number of individual light sources and the differences thereof with regard to the beam characteristic, a large number of main light beam directions (beam angles of the array and/or of the individual light sources) can be produced. The beam angle of the array can be advantageously varied continuously or in stages. Further advantageously, an optical element is connected downstream of the light sources of the array, by means of which element the beamforming in the light beam direction of the light sources can be adjusted, the control unit being designed and configured to control the optical element for beamforming. An optical element of this kind may comprise one or more lenses and/or a variable aperture, for example. This allows an aperture angle of a cone of light, a focusing of the light path or a direction of the light path that is produced by the array to be adjusted.

Advantageously, the color temperature and/or the brightness is regulated, current illuminance, current luminous flux, or a current color temperature being measured by one or more sensors in the vehicle interior and transmitted as sensor information to the control unit in order to adjust these parameters to predetermined target parameters. As a result of this feedback, a prevailing color temperature and a lighting intensity, for example, may be set in the internal lighting, for example. Further advantageously, there is a sensor for detecting illuminance in the immediate surrounding region of the vehicle. Advantageously, the measured values of the control unit produced by this sensor are provided and are used to regulate the light sources of the array. In particular, it is thus possible to adapt the brightness of the internal lighting and reading lighting produced in the interior to ambient brightness outside the vehicle. Advantageously, this adaptation is carried out in an automated manner.

When multicolored LEDs are used, one color can also be set and mixed. Color-sensitive sensors are used for a control loop for this purpose.

According to a further advantageous embodiment, in the device, the input unit having the touch-sensitive screen is designed and configured such that a user can select a state $FZ_i^*$ from predetermined states $FZ_i$, i=1, ..., I of the vehicle and/or can select a state $UZ_k^*$ from predetermined states $UZ_k$ of a surrounding region of the vehicle, k=1, ..., K and can associated the state(s) with the current set of control information. In addition, the device includes a memory unit for saving the current set of control information and the associated state $FZ_i^*$ and/or the state $UZ_k^*$, there being a second input element on the screen to initiate saving the current set of control information and the associated states $FZ_i^*$, $UZ_k^*$ on the memory unit.

This embodiment makes it possible to link a current set of control information to corresponding states of the vehicle and/or states of the surrounding region. In other words, a set of control information set by a user is associated with one or more states of the vehicle or the surrounding region. The sets of control information linked to the surrounding region data or vehicle data is then saved on the memory unit by the user touching the second input element.

According to a further advantageous embodiment, the above-described device further comprises a first system for detecting a current state $FZ(t)$ of the vehicle, and/or a second system for detecting a current state $UZ(t)$ of the surrounding region of the vehicle, the control unit being designed and configured in an operating mode such that if the current state $FZ(t)$ corresponds to a state $FZ_i^*$ and/or the current state $UZ(t)$ corresponds to a state $UZ_k^*$, the light sources are controlled in accordance with the set of control information associated with $FZ_i^*$ and/or $UZ_k^*$.

A saved set of control information corresponding to the detected environmental and/or vehicle data $UZ(t)$, $Fz(t)$ linked thereto can therefore be loaded. After this information has loaded, it is saved by the control unit as a current set of control information. The control unit therefore controls the light sources of the array, in order to implement the desired settings.

For example, an associated interior lighting system (an associated set of control information) can be activated for the vehicle states $FZ(t)$: unlocking a vehicle lock, opening a door after unlocking the vehicle, starting the motor, etc., so that depending on the vehicle state, an associated interior lighting system is produced automatically. Furthermore, an associated interior lighting system (an associated set of control information) can be activated for the environmental states $UZ(t)$: surrounding brightness is less than a predetermined threshold value, precipitation in the form of snow or rain, travel across countryside or urban areas, etc.

According to a further advantageous embodiment, there is also a switch by means of which the entire proposed device for controlling an interior lighting system can advantageously be activated or deactivated.

This switch advantageously makes it possible to activate or deactivate at least the control unit or the input unit. This takes place preferably by interrupting the circuit, in particular to the control unit and the touch-sensitive screen, if the screen is a device that is permanently installed in the vehicle.

According to a further advantageous embodiment, the device further comprises an additional lighting unit, by means of which exclusively internal lighting can be produced in the interior of the vehicle, it being possible to control the additional lighting unit by means of the control unit in order to produce the internal lighting, the additional lighting unit being arranged advantageously between two rear seats in the rear region of the vehicle and/or on a vanity mirror in the rear region of the vehicle.

The additional lighting unit is advantageously locally separated from the array and its individual light sources. Advantageously, the additional lighting unit produces a larger luminous flux with respect to the aperture angle of the light path than the light sources of the array. Advantageously, the additional lighting unit comprises one or more LED elements, each of which emit a higher luminous power than the individual light sources of the array. A vanity mirror is attached to the back of the back rest of the driver's seat or the front-seat passenger's seat, by way of example. In this case, the viewing direction of one of the passengers sitting on the rear seat bench is towards the vanity mirror. In this respect, when the additional lighting unit is active, the passenger on the rear seat bench can look at himself in the vanity mirror, the light of the additional lighting unit on the vanity mirror being reflected from said passenger's face to the mirror at a minimum angle. In the case of a minibus having a plurality of rear seat benches, a vanity mirror of this kind can also be attached to places other than the back of the back rest of the driver's seat or front-seat passenger's seat, for example. In this case, the expression "between two rear seats" may refer to the immediate gap, for example, between the portions of the rear seat bench back. However, the additional lighting unit may be arranged on the roof of the vehicle, the expression "between the rear seats" therefore describing the position with regard to a lateral direction of the vehicle. Accordingly, an additional lighting unit can, for example, be placed above the rear seats and at the height of the boundary between two rear seats or two portions of the rear bench.

A further aspect of the invention relates to a method for controlling an interior lighting system of a vehicle, it being possible for the interior lighting system to produce internal lighting and/or reading lighting, and the interior lighting system having an array of a plurality of light sources, comprising the steps of:

a user inputting a current set of control information for a control unit into an input unit that can be connected to the control unit, the input unit having a touch-sensitive screen, displaying internal lighting and/or reading lighting associated with the current set of control information for an illuminable region in the vehicle interior on the screen, and controlling the light sources of the array by means of the control unit in order to produce the internal lighting and/or the reading lighting on the basis of the current set of control information.

Advantages and advantageous developments of the method can be found by the corresponding and analogous application of the embodiments that have been produced above in connection with the proposed device.

A further aspect of the invention relates to a vehicle having a device as described above.

Further advantages, features and details can be found in the following description, in which at least one embodiment is described in detail, optionally with reference to the drawings. Identical, similar and/or functionally identical parts are provided with the same reference signs.

BRIEF DESCRIPTION OF THE DRAWING FIGURES

Figure 2:
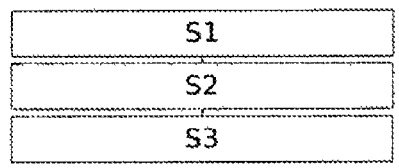
Figure 3:
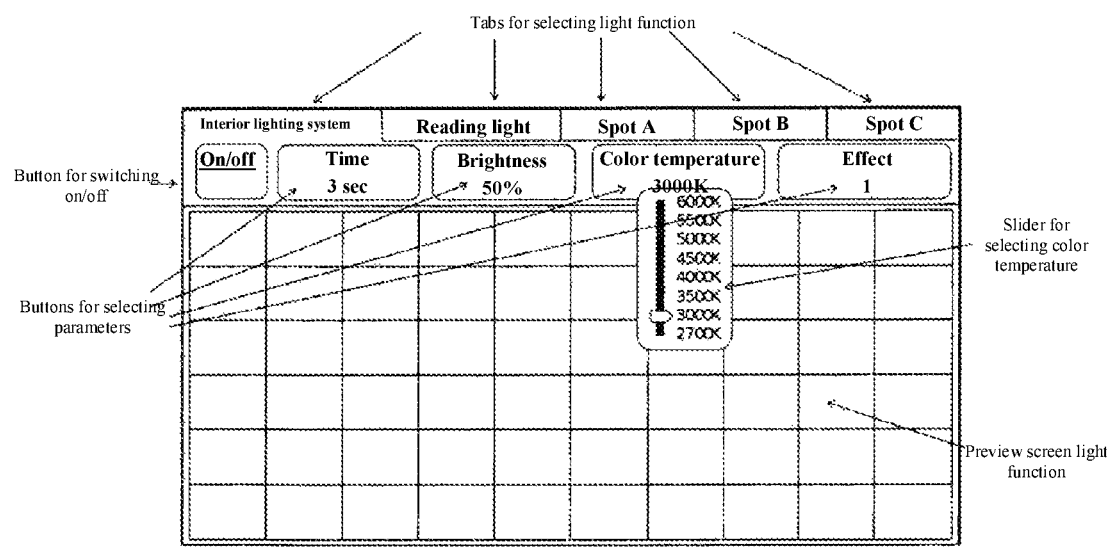
Figure 4:
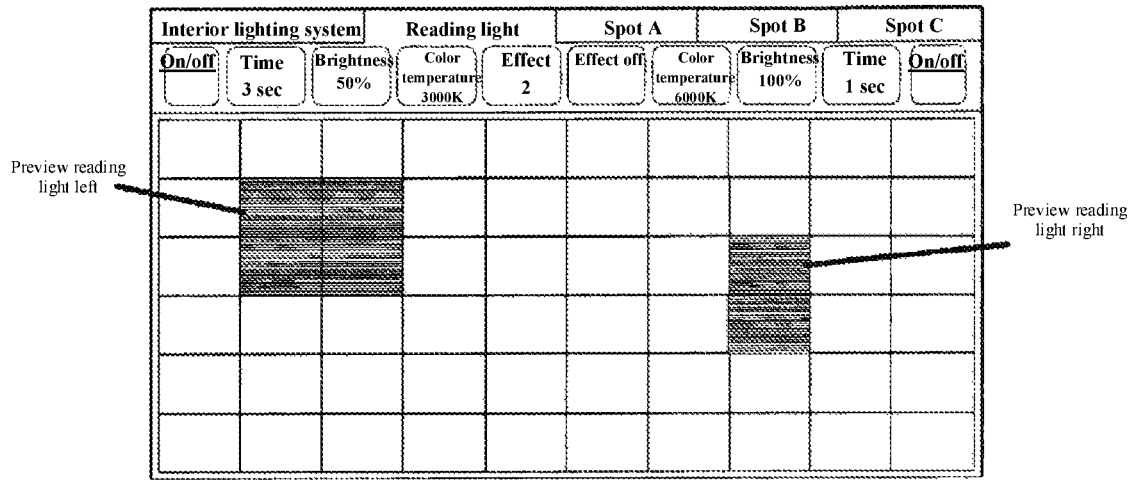
Figure 5:
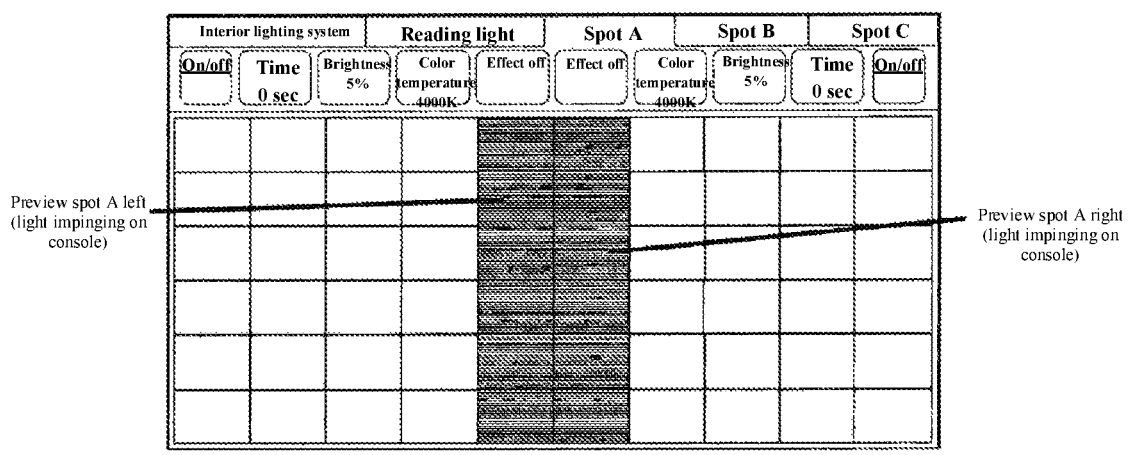

In the drawings:

FIG. 1 shows a vehicle having a device for illuminating the interior of the vehicle according to an embodiment of the invention, and FIG. 2 shows a method for illuminating the interior of the vehicle according to an embodiment of the invention, FIG. 3 shows a touch-sensitive screen having an illustrated slide control according to a further embodiment of the invention, FIG. 4 shows a touch-sensitive screen having a display of reading lighting according to a further embodiment of the invention, FIG. 5 shows a touch-sensitive screen having a display of locally limited lighting according to a further embodiment of the invention, and FIG. 6 shows a touch-sensitive screen having selectable settings according to a further embodiment of the invention.

The illustrations in the drawings are schematic and not to scale.

DETAILED DESCRIPTION

FIG. 1 shows a vehicle 1 having a device 100 for controlling an interior lighting system. This device 100 comprises an array 15 having light sources 16. In order to increase the luminous flux and thereby the illuminance in the vehicle 1, an additional lighting unit 17 is also available, which is attached between the rear seats 55 or the vanity mirror 57. A control unit 25 is used to control the light sources 16. The control unit 25 receives its instructions from a user, who enters inputs on the input unit 27. For this purpose, this input unit 27 has a screen 28. The screen 28 comprises a first input element 29 that is used to confirm the current set of control information. These settings selected in the context of a preview are adopted and executed on the light sources 16 of the array 15 only when the user confirms the current set of control information by touching the first input element 29. Furthermore, a second input element 30 is used to initiate saving the current set of control information and link information on the memory unit 32. A current set of control information associated with specific states is saved on a memory unit 32. Furthermore, there is a switch 36, which permits a user to either activate or deactivate the device.

FIG. 2 shows a method for controlling an interior lighting system of a vehicle 1, it being possible for the interior lighting system to produce internal lighting and/or reading lighting, and the interior lighting system having an array 15 of a plurality of light sources 16. The method comprises the following steps:

a user inputting S1 a current set of control information for a control unit 25 into an input unit 27 that can be connected to the control unit 25, the input unit 27 having a touch-sensitive screen 28, displaying S2 internal lighting and/or reading lighting associated with the current set of control information for an illuminable region in the vehicle interior on the screen 28, and controlling S3 the light sources 16 of the array 15 by means of the control unit 25 in order to produce the internal lighting and/or the reading lighting on the basis of the current set of control information.

FIG. 3 shows a touch-sensitive screen 28 having a slider for adjusting the color temperature of the light sources 16 of the array 15. The color temperatures range from 2,700 kelvin (2,700 K) to 6,000 kelvin. Furthermore, the interior lighting system can be switched on or off. The operating element "on/off" is available for this purpose. Furthermore, a period of time can be input that determines how many seconds pass while increasing the dim level of the light sources, i.e., a period of time from switching on until the predetermined luminous flux is fully reached. This period of time, which is selected to be three seconds in the example, therefore determines the increase in luminous flux over time in a switch-on process. The stationary luminous flux is determined in a "brightness" parameter, the brightness already taking into account the psychophysiological effects of human perception. Furthermore, the brightness can be input as a percentage value of the maximum brightness. For example, the human eye does not perceive a doubling of the luminous flux as a doubling of the subjectively perceived brightness, but rather as a logarithmically formed value thereof. Similar to this transition period, the parameter "effect" describes a time sequence of lighting, in particular of the luminous flux and the extent of the illuminated region. The pre-set parameters "spot" "A" to "C" provide specific settings of the reading light. Specifically, the spots contain, by way of example, the option for the user to activate internal light, reading light and spots irrespective of the reading light, for example, on the seat pocket, center console or belt buckle.

FIG. 4 shows a touch-sensitive screen 28, on which an illumination region of the interior of the vehicle 1 is shown symbolically on the screen 28. The drawing shows two illumination regions of a left-hand cone of reading light and a right-hand cone of reading light on the screen 28 as an image of the actual illumination regions in the vehicle interior. In this example, the "reading light" tab is activated accordingly.

FIG. 5 shows a touch-sensitive screen 28, on which an illumination region of the interior of the vehicle 1 is shown symbolically on the screen 28. The drawing shows an illumination region in the center of the vehicle, which is set by the "spot A" tab by way of example.

FIG. 6 shows a touch-sensitive screen 28 having a graphic user surface for configuring the settings. This relates, inter alia, to loading the factory settings, the option that when the program is ended the current control information, and optionally the link information, i.e., the information regarding the current state FZ(t) of the vehicle and/or the current state UZ(t) of the surrounding region of the vehicle, should be saved. Furthermore, it can be set whether effects are to be implemented when switching on and off. Effects of this kind introduce the desired lighting in an artificially decelerated manner, also called "fade-in." When switching off, a soft transition from the "lighting" state to the "off" or "dark" state of some to all of the light sources 16 of the array 15 can also be achieved.

Although the invention has been illustrated and explained in detail by preferred embodiments, the invention is not restricted by the examples disclosed and other variations can be derived by a person skilled in the art without leaving the scope of protection of the invention. It is therefore clear that a large number of possible variations exist. It is also clear that embodiments cited by way of example are really only examples that should not be understood in any way as limiting the scope of protection, the possible applications or the configuration of the invention. Instead, the preceding description and the description of the drawings allow a person skilled in the art to specifically implement the exemplary embodiments, said person being able, being aware of the inventive concept disclosed, to implement various changes, for example with regard to the function or arrangement of individual elements mentioned in an exemplary embodiment, without leaving the scope of protection defined by the claims and their legal equivalents, such as more extensive explanation in the description.

The invention claimed is:

1. A device for controlling an interior lighting system of a vehicle, wherein the interior lighting system has an array of a plurality of light sources to produce internal lighting and/or reading lighting, the device comprising:
   a control unit configured to individually control the plurality of light sources of the array to produce the internal lighting and/or the reading lighting; and
   an input unit connected to the control unit, wherein the input unit has a touch-sensitive screen configured for input of a current set of control information for the control unit,
   wherein the control unit is configured to control the plurality of light sources on the basis of the current set of control information,
   wherein the control unit is configured to control beam forming of the array of the plurality of light sources by adjusting an aperture angle of a cone of light produced by the array of the plurality of light source, a focusing of a light path produced by the array of the plurality of light sources, or a direction of the light path produced by the array of the plurality of light sources, and
   wherein the input unit is configured to display, on the basis of the current set of control information and concurrently with a display of a plurality of buttons for adjusting parameters of the internal lighting and/or reading light, an illuminable region of the interior of the vehicle within a grid on the screen, wherein the displayed illuminable region includes at least one illumination region of the interior of the vehicle that is displayed within the grid on the screen as an image of a region of the vehicle as actually illuminated, including a corresponding color and brightness, by the internal lighting and/or reading light.

2. The device of claim 1, further comprising:
   a first input element on the touch-sensitive screen configured to confirm the current set of control information,
   wherein the control unit is configured to implement internal lighting and/or reading lighting in the vehicle interior corresponding to the current set of control information by controlling the plurality of light sources correspondingly, only after selection of the first input element to confirm the current set of control information.

3. The device of claim 2, wherein
   the input unit having the touch-sensitive screen is configured to allow a user to select a state from predetermined states of the vehicle and/or a state from predetermined states of a surrounding region of the vehicle, and can associate the state(s) with the current set of control information,
   the device further comprises a memory unit configured to save the current set of control information and the selected state of the vehicle and/or the selected state of the surrounding region of the vehicle,
   the touch-sensitive screen further comprises a second input element configured to initiate saving the current set of control information and the associated state of the vehicle and/or of the surrounding region of the vehicle in the memory unit.

4. The device of claim 3, further comprising:
   a first system configured to detect a current state of the vehicle; and
   a second system configured to detect a current state of the surrounding region of the vehicle,
   wherein the control unit is configured such that, in an operating mode and responsive to selection of the current state of the vehicle as a first state and/or a current state of the surrounding region of the vehicle as a second state, the plurality of light sources are controlled in accordance with the set of control information associated with the first state and/or second state.

5. The device of claim 1, wherein the control unit is configured to implement, during the input of a current set of control information into the input unit, internal lighting and/or reading lighting associated with the current set of control information in the vehicle interior in real time by controlling the plurality of light sources correspondingly.

6. The device of claim 1, wherein a set of control information comprises at least one of:
   a color temperature,
   a value of luminous flux for setting the brightness of the internal lighting and/or the reading lighting,
   an illumination region of the reading lighting in the vehicle interior,
   a lighting scenario for the internal lighting,
   a lighting scenario for the reading lighting,
   a start time and/or an end time or a period of time for the activation of the internal lighting and/or the reading lighting by the control unit,
   a time course of the color temperature,
   a time course of the value of the luminous flux for the brightness,
   a time course of an arrangement, shape, and/or size of the illumination region of the reading lighting in the vehicle interior,
   a temporally variable lighting scenario for the internal lighting, and
   a temporally variable lighting scenario for the reading lighting.

7. The device of claim 1, further comprising:
   a switch configured to activate or deactivate the device.

8. The device of claim 1, further comprising:
   an additional lighting unit configured to only produce internal lighting can be in the interior of the vehicle,
   wherein the additional lighting unit is connected to and controlled by the control unit to produce the internal lighting, and wherein the additional lighting unit is arranged between two rear seats in a rear region of the vehicle and/or on a vanity mirror in the rear region of the vehicle.

9. The device of claim 1, wherein the at least one illumination region includes at least two spaced-apart illumination regions, and wherein the grid comprises a plurality of horizontal lines running horizontally across the image of a region of the vehicle as actually illuminated by the internal lighting and/or reading light each of which is intersected by a respective one of a plurality of vertical lines running across the image of a region of the vehicle as actually illuminated by the internal lighting and/or reading light.

10. The device of claim 1, wherein each of the plurality of buttons indicates a value for a parameter associated with the respective one of the plurality of buttons.

11. The device of claim 1, wherein the input unit is configured to concurrently display the plurality of buttons for adjusting parameters of the internal lighting and/or reading light, the at least one illumination region of the interior of the vehicle within a grid on the screen, and a name of the internal lighting and/or reading light.

12. The device of claim 1, wherein the at least one illumination region of the interior of the vehicle is a plurality of illumination regions of the interior of the vehicle, which are displayed by the input unit, wherein the plurality of illumination regions of the interior of the vehicle are spatially displayed within the grid on the screen corresponding to regions of the vehicle actually illuminated by the internal lighting and/or reading light, wherein the internal lighting and/or reading light actually illuminate portions of the left and right side of the interior of the vehicle, and the plurality of illumination regions are correspondingly displayed in the left and right side of the grid.

13. A method for controlling an interior lighting system of a vehicle, wherein internal lighting and/or reading lighting can be produced by the interior lighting system, and the interior lighting system has an array of a plurality of light sources, the comprising the steps of:
receiving, by an input unit having a touch-sensitive screen and connected to a control unit, a user selection of a current set of control information;
concurrently displaying, on a display unit, a plurality of buttons for adjusting parameters of the internal lighting and/or reading light and an illuminable region of the interior of the vehicle within a grid on the screen, wherein the displayed illuminable region includes at least one illumination region of the interior of the vehicle associated with the current set of control information on the screen, wherein the at least one illumination region of the interior of the vehicle is displayed within the grid on the display on the screen as an image of a region of the vehicle as actually illuminated, including a corresponding color and brightness, by the internal lighting and/or reading light; and
controlling, by the control unit, the plurality of light sources of the array to produce the internal lighting and/or the reading lighting on the basis of the current set of control information wherein the control unit controls beam forming of the array of the plurality of light sources by adjusting an aperture angle of a cone of light produced by the array of the plurality of light source, a focusing of a light path produced by the array of the plurality of light sources, or a direction of the light path produced by the array of the plurality of light sources.

14. The method of claim 13, wherein the at least one illumination region includes at least two spaced-apart illumination regions, and wherein the grid comprises a plurality of horizontal lines running horizontally across the image of a region of the vehicle as actually illuminated by the internal lighting and/or reading light each of which is intersected by a respective one of a plurality of vertical lines running across the image of a region of the vehicle as actually illuminated by the internal lighting and/or reading light.

15. The method of claim 13, wherein each of the plurality of buttons indicates a value for a parameter associated with the respective one of the plurality of buttons.

16. The method of claim 13, wherein the display unit concurrently displays the plurality of buttons for adjusting parameters of the internal lighting and/or reading light, at least one illumination region of the interior of the vehicle within a grid on the screen, and a name of the internal lighting and/or reading light.

17. A vehicle, comprising:
an interior lighting system having an array of a plurality of light sources to produce internal lighting and/or reading lighting; and
a device, comprising
a control unit configured to individually control the plurality of light sources of the array to produce the internal lighting and/or the reading lighting; and
an input unit connected to the control unit, wherein the input unit has a touch-sensitive screen configured for input of a current set of control information for the control unit,
wherein the control unit is configured to control the plurality of light sources on the basis of the current set of control information,
wherein the control unit is configured to control beam forming of the array of the plurality of light sources by adjusting an aperture angle of a cone of light produced by the array of the plurality of light source, a focusing of a light path produced by the array of the plurality of light sources, or a direction of the light path produced by the array of the plurality of light sources, and
wherein the input unit is configured to display, on the basis of the current set of control information and concurrently with a display of a plurality of buttons for adjusting parameters of the internal lighting and/or reading light, an illuminable region of the interior of the vehicle within a grid on the screen, wherein the displayed illuminable region includes at least one illumination region of the interior of the vehicle within the grid on the screen as an image of a region of the vehicle as actually illuminated, including a corresponding color and brightness, by the internal lighting and/or reading light.

18. The vehicle of claim 17, wherein the at least one illumination region includes at least two spaced-apart illumination regions, and wherein the grid comprises a plurality of horizontal lines running horizontally across the image of a region of the vehicle as actually illuminated by the internal lighting and/or reading light each of which is intersected by a respective one of a plurality of vertical lines running across the image of a region of the vehicle as actually illuminated by the internal lighting and/or reading light.

19. The vehicle of claim 17, wherein each of the plurality of buttons indicates a value for a parameter associated with the respective one of the plurality of buttons.

20. The vehicle of claim 17, wherein the input unit is configured to concurrently display the plurality of buttons for adjusting parameters of the internal lighting and/or reading light, the at least one illumination region of the interior of the vehicle within a grid on the screen, and a name of the internal lighting and/or reading light.

\* \* \* \* \*